United States Patent [19]

Grant, Jr.

[11] 4,227,674
[45] Oct. 14, 1980

[54] LIQUID METERING VALVE

[76] Inventor: Walter H. Grant, Jr., 320 Board of Trade Pl., New Orleans, La. 70130

[21] Appl. No.: 811,682

[22] Filed: Jun. 30, 1977

[51] Int. Cl.³ .................... F16K 21/06; F16K 31/128
[52] U.S. Cl. ........................................ 251/15; 251/36; 251/47; 251/54; 251/42
[58] Field of Search ................... 251/36, 45, 46, 47, 251/54, 42

[56] References Cited

U.S. PATENT DOCUMENTS

| 713,138 | 11/1902 | Nethery | 251/15 |
|---|---|---|---|
| 752,176 | 2/1904 | Nethery | 251/15 |
| 871,859 | 11/1907 | Brooks | 251/36 |
| 1,250,388 | 12/1917 | Titus | 251/36 |
| 1,297,836 | 3/1919 | Gulick | 251/36 |
| 1,319,022 | 10/1919 | Titus | 251/36 |
| 1,437,650 | 12/1922 | Gulick | 251/36 |
| 1,471,504 | 10/1923 | Myer | 251/36 |
| 1,474,472 | 11/1923 | Gulick | 251/36 |
| 1,812,301 | 6/1931 | Nasmyth | 251/36 |
| 2,914,293 | 11/1959 | Harrell | 251/36 |
| 3,008,682 | 11/1961 | Filliung et al. | 251/42 |
| 3,008,683 | 11/1961 | Filliung et al. | 251/42 |

*Primary Examiner*—Alan Cohan
*Assistant Examiner*—G. L. Walton

*Attorney, Agent, or Firm*—James Creighton Wray

[57] ABSTRACT

A liquid metering flush valve to be installed in connection with plumbing fixtures such as water closets, urinals, service sinks, and other equipment and to supply said fixtures with a predetermined amount of water; which may be potable water, contaminated water, sea water, corrosive and/or unfiltered water, and water and/or oil combinations; at controlled pressures, flow rates and volumes. The basic valve design is on the hydraulic principal of proportional flow through orifices, regardless of pressure fluctuation but employs the use of four chambers, two of which are sealed and contain not only an orifice therebetween but a filtered, non-corrosive captive liquid to assure the orifice of protection from corrosive action and dirt which may damage the orifice or clog it and prevent it from working properly. One basic body design for either exposed or concealed valve installation simplify stocking and production requirements and costs and promote water economy through an adjustable feature which permits use of a minimum amount of water volume. The flexibility of selection of a Diaphragm model, Bellows model, or a Piston model best utilizes modern materials for maximum service when handling liquids other than clean, grit free, non-corrosive, potable water.

17 Claims, 5 Drawing Figures

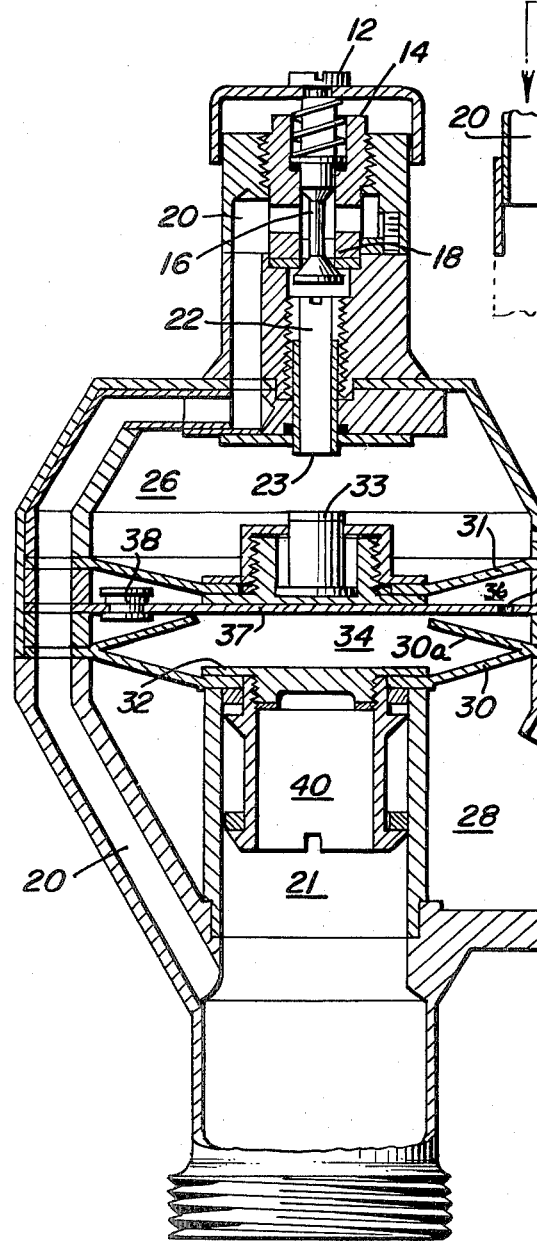
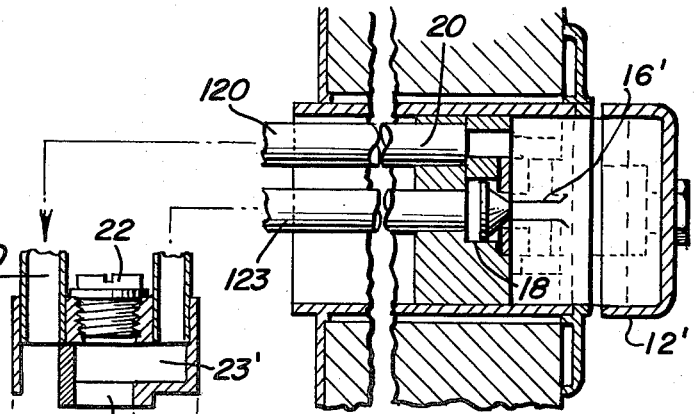
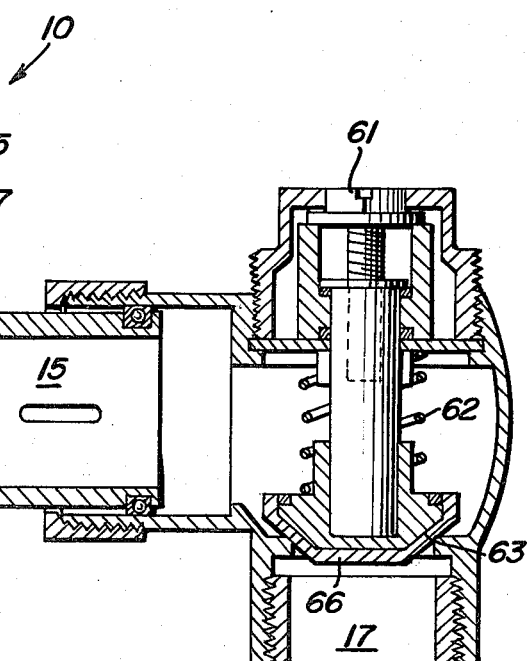
FIG. 1
FIG. 3

LIQUID METERING VALVE

BACKGROUND OF THE INVENTION

1. Field of the Invention

This invention relates generally to devices using the principle of predictable movement when equal pressures applied to unequal areas result in unequal forces. Called a flush valve or flushometer this device also relates to devices for metering a predetermined volume of liquid to a fixture.

2. Description of the Prior Art

A common problem with known type devices using an orifice and check valve to establish the rate of valve opening and closing is that the conventional orifice and check valve are in contact with the source of liquid or gas in the mainline and therefore are subject to malfunction due to blockage of the orifice by dirt or other contaminants contained therein.

Another problem with known type devices is that the handles for concealed flush valves vary as to wall thickness of the establishments in which they are to be installed and therefore cause many problems in ordering and installing therein.

A further problem is that by having many models and types of these devices, commonly called flush valves, and different body patterns thereto because of handle locations the purchaser of said flush valve may become confused therefore complicating his selection and/or installation of the proper type flush valve for his establishment. This is very important for much money and time may be wasted if a person were to order and/or install the wrong type of flush valve for his particular purpose or establishment.

A still further problem with the aforesaid flush valve is that the bodies and parts are cast in brass which requires much machining and also has a tendency to keep the weight and cost of production high which also increases the cost to the purchaser and keeps the cost of shipping high.

Known prior art patents which may be pertinent to this invention are as follows:

U.S. Pat. No. 2,000,002
U.S. Pat. No. 2,270,259
U.S. Pat. No. 2,282,755
U.S. Pat. No. 2,734,712
U.S. Pat. No. 2,811,167
U.S. Pat. No. 2,872,150
U.S. Pat. No. 2,900,163
U.S. Pat. No. 3,020,925.

None of these known prior art devices offers the new and unique features of the invention disclosed herein. For example, U.S. Pat. No. 2,000,002, Control Valve For Gas Burners, 1932. This device controls the flow rate and downstream pressure of gas and is responsive to a pressure and/or a temperature control device which varies the pressure in a pilot chamber causing a position change in the main valve. This design is typical in gas control valves currently furnished. The orifice and check valve are incorporated to establish the rate of valve opening and closing. It is not important to note that the orifice and the check valve are in contact with the mainline gas source hence subject to malfunction due to contaminants contained therein. The subject valve of this invention incorporates a similar hydraulic principle plus the unique and distinct feature of captive fluid in contact with the orifice and check valve. Being captive the fluid quality is controlled thus eliminating the contamination mentioned above, and, thus providing a suitable valve for contaminated liquids, and further through material selection suitable for corrosive liquids.

U.S. Pat. No. 2,811,167, Pilot Operated Shut Off Valve, 1957. This device uses the well known principle of predictable movement when equal pressures applied to unequal areas result in unequal forces. The main valve is either open or closed as established by the liquid level. The use of multiple control diaphragm, floats, etc. appears to be for safety reasons. This is not a metering valve as is disclosed herein.

U.S. Pat. Nos. 2,282,755, 2,900,163 and 3,020,925 are all devices based on the above mentioned principles and actuated by pressure, or temperature or combined pressure/temperature.

U.S. Pat. Nos. 2,270,259, 2,734,712 and 2,872,150 are liquid metering valves for plumbing fixtures. Federal specifications described them as flushometers, the plumbing industry as flush valves. This is the type of device of this invention, and all true flush valves including the one disclosed herein, meter a predetermined volume of liquid to a fixture. Known type flush valves use a pilot chamber and refill orifice principle with source water passing through the orifice which is quite small and vulnerable to stoppage. The subject invention valve eliminates this problem and hence is suitable for a wide range of liquids.

The subject valve aspires to be modern with economic features, namely, most known valves require a plurality of body patterns, requiring different manufacturing techniques and equipment, and greatly increasing stocking requirements. The valve disclosed herein has a single body construction with greatly simplified manufacturing and storage/stocking requirements. Also the disclosed operating mechanism is simple and extremely flexible in installation.

The design of the valve of this invention also permits manufacturing from drawn and rolled materials with a minimum of machining and with low weight and cost. The one single body structure will fit all needs and supply all conditions.

SUMMARY OF THE INVENTION

An object of the present invention is to provide a flush valve type device that uses four chambers permitting the locating of a small orifice in a position to cross-connect two of the chambers which are sealed and contain a non-corrosive, captive liquid herein and said liquid being free from particles and contaminants that may affect the flow through the orifice and the cross-connecting check valve therefore protecting said orifice from damage from any particles or contaminants and from corrosive action of many liquids as may be used in the other two main chambers for the flushing action of this invention.

Because the other two chambers which hold the liquid to be used for the flushing action, and are therefore separate from the sealed chambers which hold the orifice and check valve, a variety of liquids which may contain small particles of dirt or other contaminants may be used in this device without concern for damage incurring because of said particles or contaminants.

Another object of the present invention is to provide flexiblity in selection by using three slightly different models; i.e. Diaphragm, Bellows or Piston models; so that manufacturers may best utilize modern materials to insure maximum service when using liquids other than clean, grit free, non-corrosive, potable water for the flushable liquid.

A further object of this invention is to provide one basic body design for exposed or concealed valve installation thus simplifying the process of ordering and/or installing for the purchaser or consumer of this invention.

A still further object of this invention is that the relief valve position is unaffected by the position of the liquid inlet to the valve and therefore lends the device the ability to be installed under many different situations and to a variety of plumbing fixtures.

The relief valve position is also independent of concealed valve body position which therefore renders the device substantially flexible in installations concealing the main body portion behind a wall or simular type structure.

An adjustable feature permits regulating of water volume and also encourages water economy through the use of minimum required volumes of water flow throughout the device.

Water is also saved by a non-hold open feature as it prevents the operator of the flush valve from inadvertently affecting the preadjusted volume and using an unnecessary excess amount of water.

Another important feature is that having only one basic body style for the device of this invention, the stocking requirement of manufacturers and distributors is greatly reduced and simplified.

Reduced machining requirements and therefore reduced costs through production of minimum parts and models needed to serve industry needs benefits the manufacturers and distributors as well as lowering costs to the purchasers or consumers.

A still further object of the present invention is to reduce problems with installation of concealed valves, flexible roughin-in dimensions, and easy field correction for varying wall thicknesses which occur in different establishments wherein the device is to be installed and therefore provides a simple solution to what may sometimes pose a problem to the purchaser.

A final object of this invention is that the inlet stop design assures a spring loading of the poppet which is unaffected by the stop adjustment and therefore holds the poppet against the seat to precent the chance of reverse flow. Where required by plumbing codes, an approved vacuum breaker is provided at the valve outlet.

These together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a sectional view of the Diaphragm model embodiment in the "closed valve" position.

FIG. 3 is a view of a relief valve modification for use when concealing the device behind a wall or simular type structure.

DESCRIPTION OF THE PREFERRED EMBODIMENT

Figure 2:
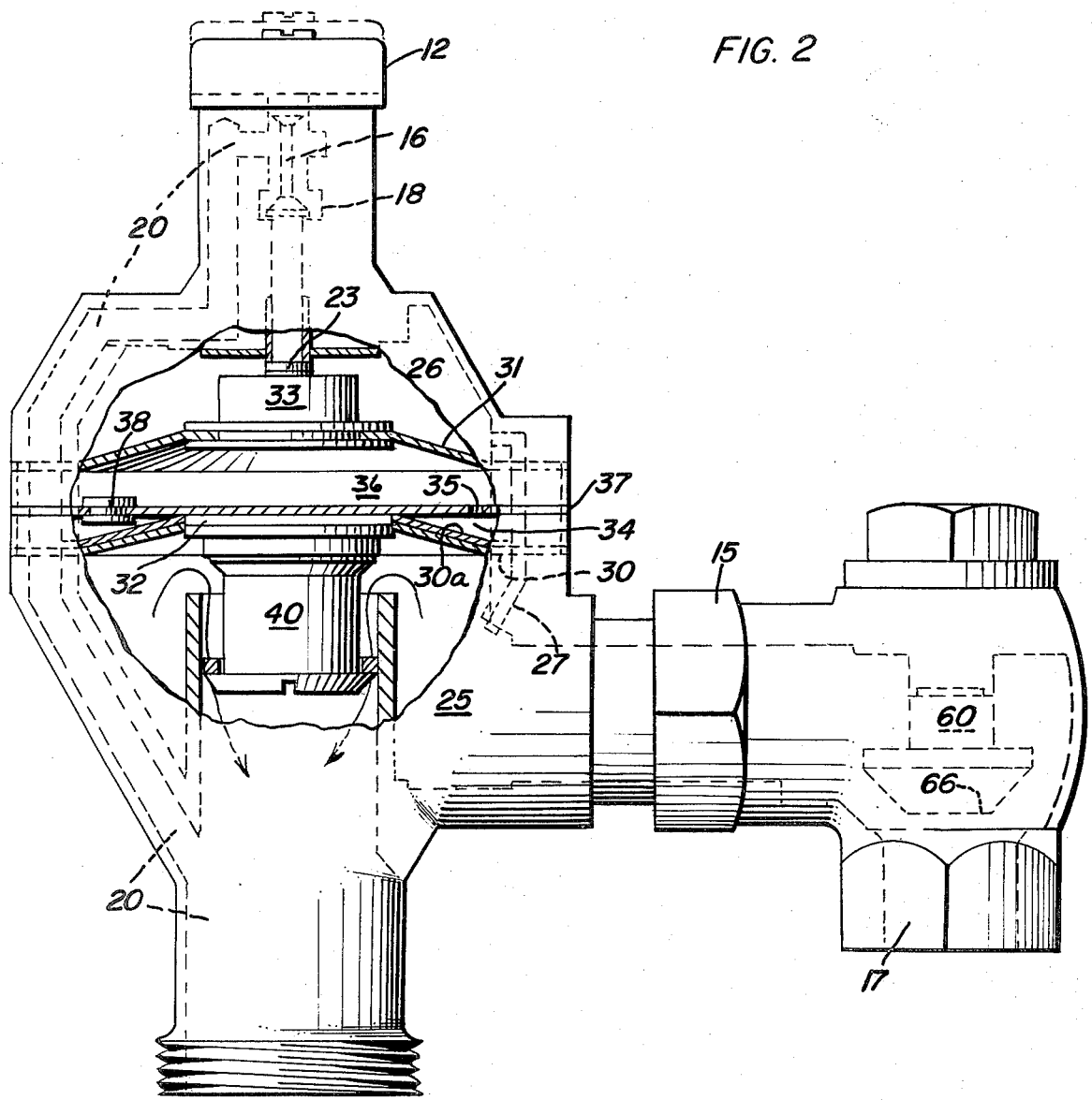
FIG. 2 is a sectional view of the Diaphragm model embodiment in the "open valve" position.

Referring to FIG. 1 of the drawings, reference numeral 10 indicates in general the flush valve of this invention in the closed, no flow position. To actuate the valve the operator depresses the valve actuating means 12 which depresses spring 14 and forces plunger 16 down, therefore opening passage 18 to release water or other liquid as may be used, into the relief valve outlet 20 to the fixture. This action causes the relief of pressure in the chamber 26 and the higher pressures in the opposite chamber 28 forces the flexible diaphragms 30, 31 with the attached seat 32 away from the outlet 21 therefore permitting flow to the fixture. The flow characteristics are established by the design of the poppet 40.

The pressure in chamber 34 is rapidly relieved into chamber 36 through the check valve 38, so as not to resist the movement of flexible diaphragms 30, 31 and seat 32. Flexible part 31 moves upward with check valve 33 towards the adjusting screw inlet 23 to the point of adjustment of the adjusting screw 32 therefore closing the adjusting screw inlet 23 by the placing of the check valve 33 against said inlet 23, preventing further flow from chamber 26, and thus limiting the movement of seat 32.

At this point the pressure starts to equalize between chambers 26 and 28 through equalizer connection 27. The force of the increasing pressure in chamber 26 against the full area of part 31 results in the slow closing of the valve by said force on part 31 moving the captive liquid in chamber 36 through the properly sized orifice 35 into chamber 34. Part 30 is thus moved with attached seat 32 and poppet 40 to close off the relief outlet 21. The position of adjusting screw 22 and the area of orifice 35 establishes the delivery volume. A rigid plate 37 separates chambers 34, 36 and contains the orifice 35 and check valve 38.

A control stop consisting of poppet 60, "L" spring 62, adjusting screw 64 and check valve 66 and connecting the flush valve 10 by way of a pipe 15 to the water inlet 17 regulates the flow of water entering the flush valve and also shuts off the water supply. This is the basic design of control valves used in many metering devices and allows the water to be shut off in one flush valve at a time which aids in repairing a flush valve in that the water in the riser does not need to be shut off therefore rendering all of the fixtures connected to the riser out of service while repairs to one flush valve are made.

FIG. 2 refers to the flush valve in an "open valve" position with like numerals in FIG. 1 referring to like numerals in FIG. 2. The valve actuating means 12 is shown being depressed forcing plunger 16 down to open passage 18 letting water escape from chamber 26 up the adjusting screw inlet 25, through passage 18 and into the relief valve outlet 20 leading to the fixture.

This relief of pressure again forces the captive liquid in chamber 34 to rapidly move into chamber 36 via check valve 38 forcing the diaphragm parts 31, 30 and attached seat 32 to rise upward along with attached poppet 40. This also places check valve 33 against the adjusting screw inlet 25 thus closing said inlet and forcing plunger 16 back to a closed position.

The pressure then starts to regulate through equalizer connection 27 from chamber 28 which slowly pushes diaphragms 31, 30 and connecting parts thereof, as stated above, down while the captive liquid in chamber 36 is slowly forced into chamber 34 via orifice 35. This action returns the valve to the position of "closed valve" as in FIG. 1.

In FIG. 3 is shown a modification for a concealed valve which could be used for any wall of any material of any thickness. By using lengths of tubings 120, 123 adjusting screw inlet 23' and relief valve outlet 20' are extended and made as long as necessary to connect to the passage 18', plunger 16', and valve actuating means 12 which are installed on the operator's side of the wall. The action of the flush valve is not affected therefore and as much tubing can be used as deemed necessary according to wall thickness, the position of relief valve to the main body of the flush valve and the desire of consumer as well as the type of installation.

Figure 4:
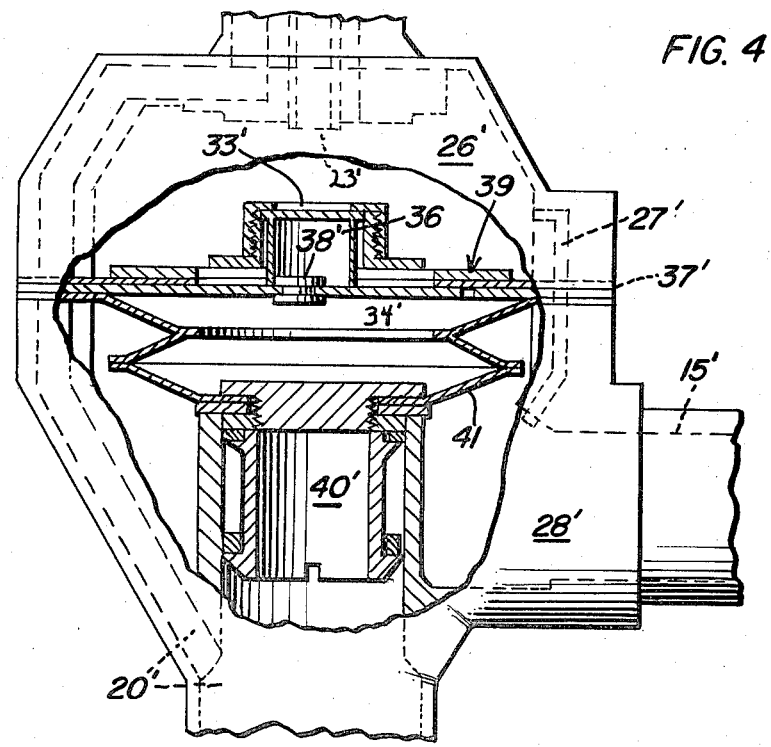
FIG. 4 is a sectional view of the Bellows model embodiment in the "closed valve" position.

FIG. 4 shows the Bellows model embodiment of this invention. Although the basic operation is the same the two sealed chambers 34', 36' which contain the captive liquid is of a slightly different shape and action. Namely, the flexible diaphragms 30 and 31 of the first embodiment have been replaced by bellows 39 and 41 in this second embodiment.

As liquid is released from chamber 26', as described before for chamber 26, the pressure in chamber 28' forces the captive liquid in chamber 34' to be rapidly relieved into chamber 36' via check valve 38' thus causing the folding up of bellows 41 drawing poppet 40' upward. As the liquid flows into chamber 36' it causes the bellows 39 to unfold pushing the check valve 33' upward until it is flush against the adjusting screw inlet 23' and closes said inlet. The pressure in chambers 26', 28' is then regulated through equilizer connection 27', this pressure causes the liquid in chamber 36' to slowly be pushed into chamber 34' via orifice 35' causing the folding up of bellows 39, returning check valve 33' to its original position, and the unfolding of bellows 41, returning poppet 40 to its original position, which is the "closed valve" position of the diagram.

Figure 5:
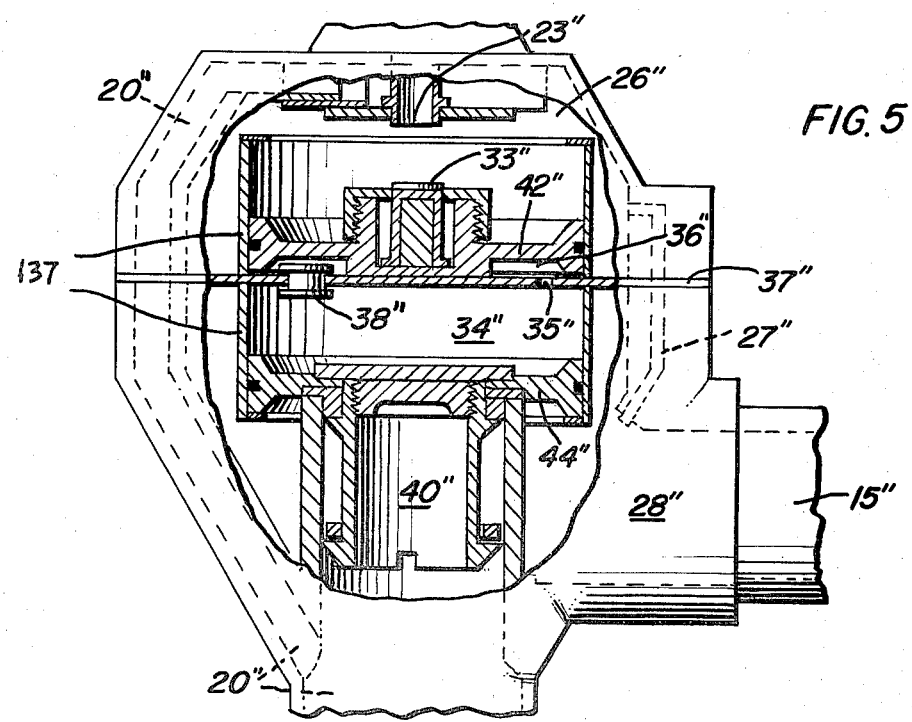
FIG. 5 is a sectional view of the Piston model embodiment in the "closed valve" position.

The Piston model embodiment of this invention is shown in FIG. 5. Again the operation is basically the same as the other models with only the shape and action of the two sealed chambers being different, a cylinder 137 with pistons 42 and 44 being provided. As the pressure changes in chambers 26", 28" through the release of pressure as liquid escapes into the relief valve 20" via adjusting screw inlet 23", forces in chamber 28" push piston 44 along with connecting poppet 40 upward causing the rapid release of captive liquid from chamber 34" into chamber 36" via check valve 38" which also pushes piston 42 upward along with connecting valve 33". Check valve 33" comes to rest against the adjusting screw inlet 23" thus closing it and as pressure starts to regulate through equilizer connection 27" the increasing pressure in chamber 26" forces piston 42 down which in turn causes the captive liquid in chamber 36" to slowly return to chamber 34" via orifice 35" and push piston 44 downward along with poppet 40" which returns the flush valve to its original "closed valve" position as shown in the diagram.

In all models, the orifice 35 and the check valve 38 are in a rigid plate 37 that separates the chambers 34, 36. All models may also be used with the modification device of FIG. 3 and are flexible as to the position and type of installation, be it concealed behind a wall or other such support, or outstanding.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A liquid metering flush valve for controlling and supplying liquid to a plumbing fixture comprising: control means for regulating supply liquid flow through the valve from an inlet to an outlet, the control means including two movable sealed valve chambers containing captive fluid separate from supply liquid passing through said valve, the two sealed valve chambers being separated by a rigid plate which contains an orifice and check valve, said two chambers having the captive fluid therein to pass through the orifice and check valve to regulate the actuation of the valve, the control means including third and fourth chambers communicating with the inlet and positioned on opposite sides of said two sealed chambers, valve operator means and valve actuating means responsive to operator means actuation for effecting operation of said control means to control the flow of the supply liquid from the third chamber to the outlet whereby fluid in the fourth chamber pushes the two movable chambers toward the third chamber, means for mounting the valve operator means remote from the control means, first and second lengths of tubing and means to connect the first and second lengths respectively to the third chamber and to the outlet, and means on the two movable valve chambers for preventing flow from the third chamber to the outlet upon movement of the two sealed chambers in a maximum direction toward the third chamber, the last mentioned means including non-hold open means for continuing to prevent flow from the third chamber as the two sealed chambers move toward the fourth chamber.

2. The structure as set forth in claim 1, wherein the said captive fluid in the sealed chambers is a non-corrosive, clean, contaminant free liquid so that the check valve and orifice may be protected from stoppage or damage by particles or contaminants in liquid flowing through and being controlled by the valve.

3. The structure as set forth in claim 1, wherein said valve actuating means includes a control button responsive means to initiate action of the flush valve and permit a predetermined volume of fluid to pass therethrough prior to deactivation.

4. The structure as set forth in claim 3, also including the feature of valve actuating means position being uneffected by the position of the liquid inlet to the flush valve.

5. The structure as set forth in claim 4 further including the feature of the valve actuating means position being independent of a concealed valve position.

6. The structure as set forth in claim 1, including means to allow flexiblity in construction so as to best utilize modern materials for maximum service when handling liquids other than clean, grit free, non-corrosive water.

7. The structure as set forth in claim 6, also including the use of one basic body design for both exposed and concealed valve installation.

8. The structure as set forth in claim 7, further including means for reducing problems with installation of concealed valves, flexible, roughing-in dimensions and easy field correction for varying wall thicknesses.

9. The structure as set forth in claim 8, wherein the means for reducing permits the production of minimum parts and models as required to serve industry needs thereby reducing machinery requirements and therefore costs.

10. The structure as set forth in claim 9, wherein said means for reducing also simplifies stocking requirements for manufacturers and distributors.

11. A liquid metering flush valve for controlling and supplying liquid to a plumbing fixture comprising: a housing for connection between an inlet source of supply liquid and an outlet plumbing fixture; a poppet within said housing and associated therewith to selectively permit said supply liquid to flow through said housing; means for actuating said poppet; and control means including two movable sealed chambers containing a captive fluid completely separate from the supply liquid, valve operator means and valve actuating means responsive to operator means actuation for effecting operation of said control means to control the flow of the supply liquid from the third chamber to the outlet whereby fluid in the fourth chamber pushes the two movable chambers toward the third chamber, means for mounting the valve operator means remote from the control means, first and second lengths of tubing and means to connect the first and second lengths respectively to the third chamber and to the outlet, and means on the two movable valve chambers for preventing flow from the third chamber to the outlet upon movement of the two sealed chambers in a maximum direction toward the third chamber, the last mentioned means including non-hold open means for continuing to prevent flow from the third chamber as the two sealed chambers move toward the fourth chamber.

12. The structure as set forth in claim 11, wherein additional means includes an inlet stop design which assures a spring loading of poppet unaffected by stop adjustment.

13. The structure as set forth in claim 11, further including an adjustable means which permits and encourages water economy through use of a minimum required volume of liquid flow.

14. The structure as set forth in claim 11, wherein the device includes additional means to render it usable with many different types of plumbing fixtures which may require a pre-determined volume of liquid flow thereto.

15. The liquid metering flush valve of claim 11, wherein said control means includes at least one flexible diaphragm defining at least a portion of a sealed chamber for the captive fluid.

16. The liquid metering flush valve of claim 11, wherein said control means includes at least one bellows defining at least a portion of a sealed chamber for said captive fluid.

17. The liquid metering flush valve of claim 11, wherein said control means includes at least one piston defining at least a portion of a sealed chamber for said captive fluid.

* * * * *